E. W. PYLE.
DRY CLOSET.
APPLICATION FILED JAN. 19, 1915.
1,206,591.
Patented Nov. 28, 1916.
2 SHEETS—SHEET 1.
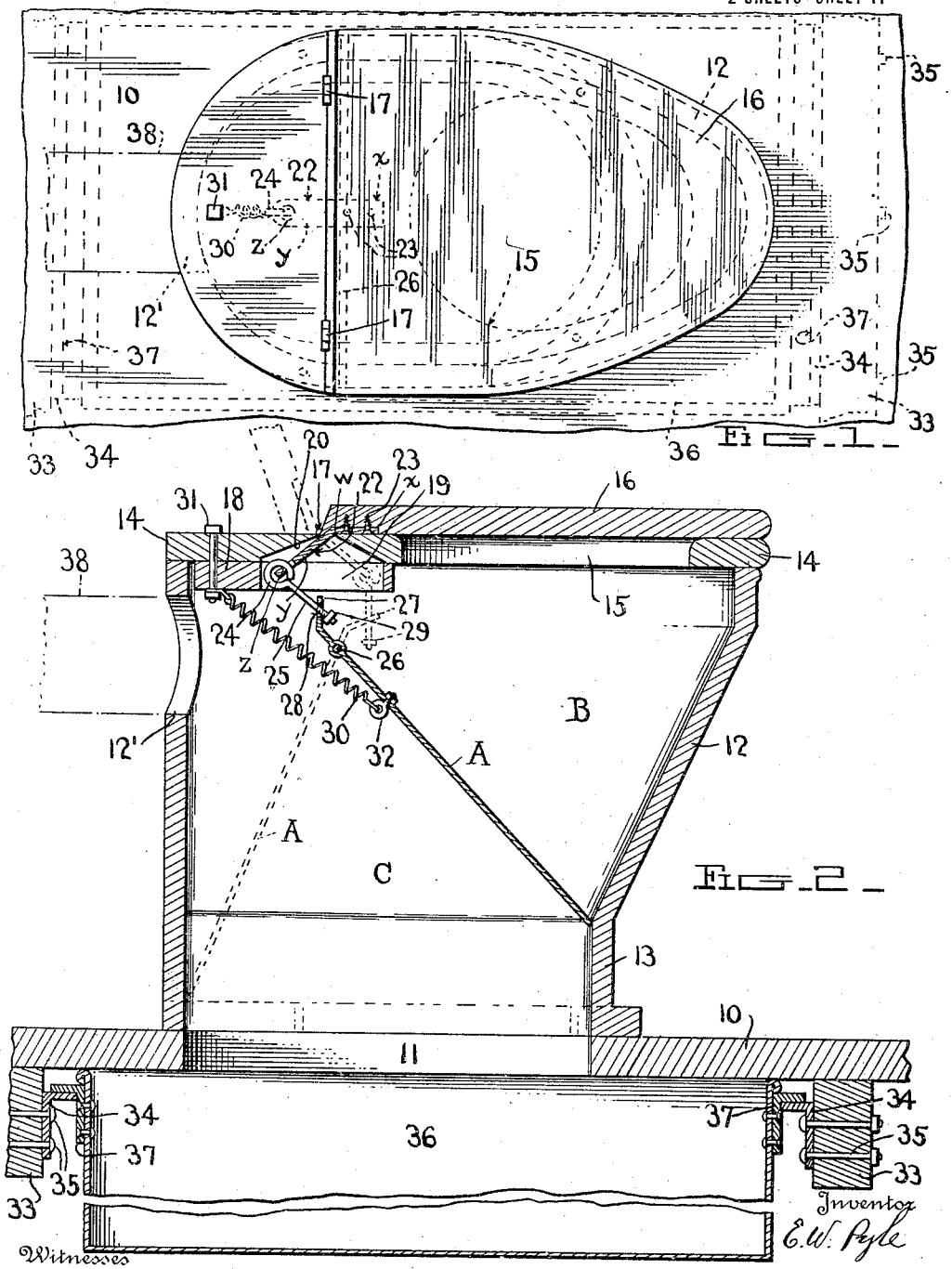

E. W. PYLE.
DRY CLOSET.
APPLICATION FILED JAN. 19, 1915.
1,206,591.
Patented Nov. 28, 1916.
2 SHEETS—SHEET 2.
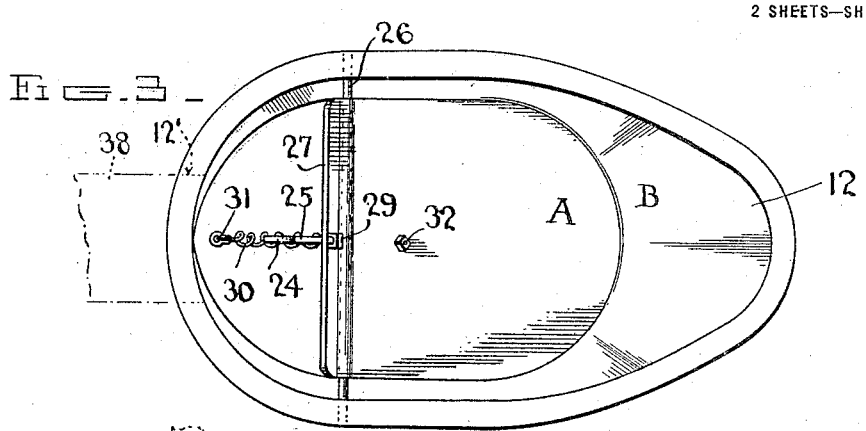
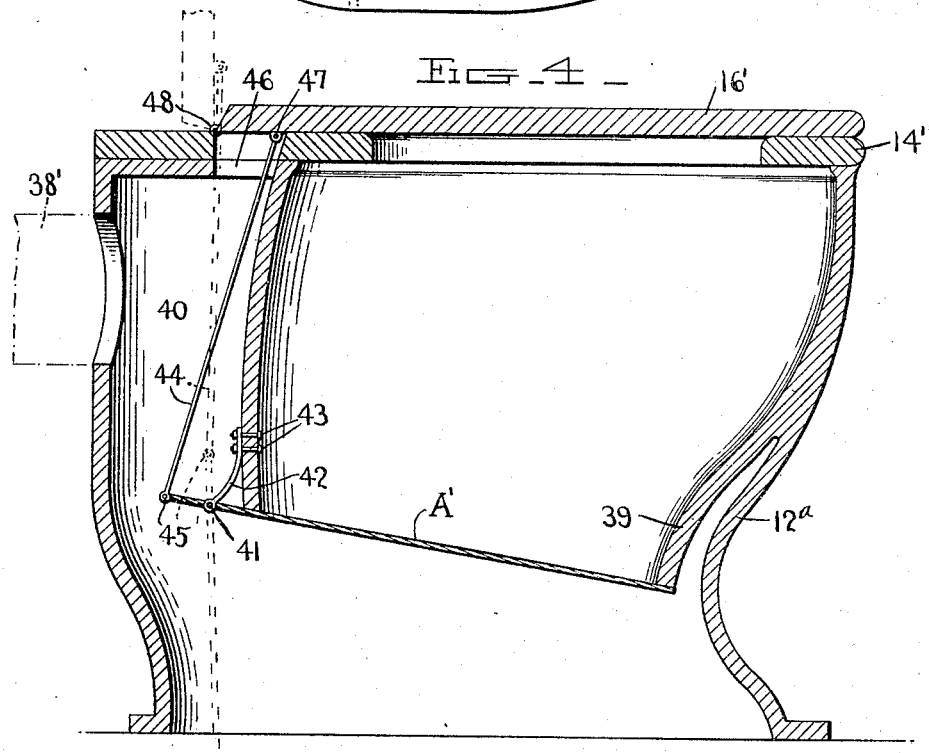

UNITED STATES PATENT OFFICE.

EBEN W. PYLE, OF WICHITA FALLS, TEXAS.

DRY CLOSET.

1,206,591.   Specification of Letters Patent.   Patented Nov. 28, 1916.

Application filed January 19, 1915.   Serial No. 3,119.

*To all whom it may concern:*

Be it known that I, EBEN W. PYLE, a citizen of the United States, residing at Wichita Falls, in the county of Wichita and State of Texas, have invented certain new and useful Improvements in Dry Closets, of which the following is a specification.

This invention relates to dry closets.

One object is to provide an odorless dry closet embodying among other characteristics means whereby the bowl may be divided into upper and lower compartments under the influence of movement of the lid of the bowl so that when the lid is closed odors and fumes will be directed from the lower compartment out through a vent opening formed in the bowl.

Another object resides in the provision of an odorless dry closet embodying a bowl which is open at its top and at its bottom and which is also provided with a vent opening and a hinged lid and in which there is pivotally mounted a trap plate operable for swinging movement in one direction under the influence of swinging movement of the lid to closed position on the bowl to divide the bowl into separate compartments and cause the deflection of odors and fumes from the lower compartment out through said vent opening and which trap plate is movable automatically in the opposite direction from across the bowl when the lid is raised.

A still further object is to provide an odorless dry closet including a bowl and a receptacle to receive the urine and feces, and which receptacle may be positioned with relation to the bowl and readily removed from coöperation therewith for discharging purposes and in which the bowl may be stored or shipped when desired.

It is still further designed to provide an odorless dry closet embodying an open-ended bowl having a vent opening and a receptacle removably positioned below the bowl for coöperation therewith and in which bowl there is mounted means movable into different positions so as to shut off communication between the upper portion of the bowl and the receptacle and which is movable out of such position to provide for communication between the bowl and receptacle entirely through the bowl.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

In the drawings, Figure 1 is a top plan view of the invention with the flooring removed. Fig. 2 is a vertical sectional view of the invention. Fig. 3 is a top plan view of a modified form of the invention. Fig. 4 is a vertical sectional view of the modification.

Referring now more particularly to the accompanying drawings, the reference character 10 indicates a floor of any kind provided with an opening 11.

An open-ended bowl 12 of any suitable character,—an oval shaped one being illustrated,—and having a vent opening 12' is mounted over the opening 11 and secured to the floor 10 in any suitable manner, the interior of the lower portion 13 of the bowl being open and preferably of the same shape and size as the opening 11.

The bowl is provided with a seat portion 14 having a seat opening 15. At the rear of the seat opening 15 a lid 16 is hingedly connected, as at 17, in any suitable manner.

A trap plate A is swingingly mounted in the bowl 12 in any suitable manner. One means for this purpose may reside in a shaft 26 journaled in the sides of the bowl 12 and to which the plate is secured adjacent its upper edge. This plate A has a flange 27 extending throughout its width and which is provided with an aperture 28.

The trap plate A may be swung across the bowl or to a position at the rear thereof for purposes presently explained, through the instrumentality of any suitable means. One way in which this may be accomplished is to dispose under the rear portion of the seat a cleat or the like 18 which is provided with a slot 19 which registers with a recess 20 formed in the under side of the seat 14. A double armed lever 22 may be employed for effecting swinging movement of the plate and which has one of its arms $x$ connected to the under side of the lid 16, for instance, by means of suitable fastenings 23, and has its other arm $y$ projecting through a slot $w$ in the seat 14 at or slightly in advance of the line of the hinge connection 17 of the lid 16 and also projecting into said recess 20 and the slot 19 of the cleat or the like 18. The arm $y$ has an eye $z$ in which is connected the eye 24 of the eye bolt 25. The shank of the eye bolt 25 extends through the aperture 28 of the flange 27 and out of which it is prevented from accidental withdrawal in any suitable manner, as for instance, by means of a nut 29. By virtue of these connections between the lid and the trap plate, the latter may be swung forwardly across the bowl against the action of a spring 30 or other suitable element. This spring 30 is secured at one end in any suitable manner within the bowl, as by means of a bolt 31, and at its opposite end it is secured in the eye of an eye bolt 32 secured to the trap plate A slightly in advance of the pivotal point of the trap plate, whereby the trap plate is swung automatically to its rear position from across the bowl when the lid is raised, as will later appear.

The floor 10 may be of that character as to be mounted upon and secured to beams 33, that is, an ordinary wood floor construction. At any rate, elements, such as beams 33, may be secured to the under side of the floor 10, if the floor 10 is not supported thereby, and metallic or other supporting elements 34 may be secured to the inner faces of the beams or the like 33 by means of bolts or other suitable elements 35. These metallic elements 34 may be in the form of angle irons and are adapted to form guides for the slidable support of a receptacle 36 of metal or other suitable material arranged beneath the opening 11 in the floor 10. One means for slidably supporting the receptacle 36 on these guides 34 may include angle irons 37 secured to the outer sides of the receptacle and which may overlap the angle irons 34 so that the receptacle 36 will not only be supported in proper position to receive urine and feces, but so that it may be easily moved out of position with relation to the bowl, when desired, for discharging purposes. Any suitable means may be employed for supporting the receptacle 36, the means illustrated and described being simply illustrative of one means for the purpose.

The receptacle 36 at its upper edge preferably has such close relation to the under side of the flooring 10 as to prevent the escape of odors and fumes between the receptacle 36 and the floor 10, yet not preventing free sliding movement of the angle irons 37 on the angle irons 34. The receptacle 36, however, is preferably of such size that for shipping, storing or other purposes it may receive the bowl 12, in which event space would be reduced to a minimum both for storing and for shipping purposes, as compared with storage and shipment of the bowl and receptacle separately.

When the lid 16 is in closed position the trap plate A assumes a forward inclined position, as shown in Fig. 2. This plate is of such shape and of such size as to fit closely but not tightly against the inner walls of the bowl 12 when thrown to its position shown in full lines in Fig. 2. When the trap plate A is thus positioned it divides the bowl into upper and lower compartments B and C. All odors from the receptacle and bowl are, therefore, caused to be deflected by the trap plate A out through the vent 12'. This vent 12' may lead directly to the atmosphere or, if desired, a vent pipe 38 may be connected to the opening 12' and lead to the atmosphere at some remote point or it may be connected to a chimney (not shown), or it may be carried through a ceiling and roof (not shown) to sufficient height to provide for the creation of a draft. With the vent or conductor pipe 38 leading from the vent opening in the bowl there will be considerable draft from the bowl and, of course, from the bowl and receptacle when connected. The purpose of the movable trap plate, which in its movements will change the relative horizontal cross sections or draft space of the forward and rearward parts of the bowl, is to reduce to a minimum the draft space leading from the seat opening to the receptacle when the plate is in its forward position and, when in this forward position, to enlarge to a maximum the draft space from the receptacle 36 to the vent opening in the bowl. With the continual draft through the vent opening the reduction of the draft space as above described will cause a suction down through the seat opening because the connecting spaces between the seat opening and vent opening are so much smaller than the vent opening itself. The air will be drawn through these smaller openings with much more velocity than that in the conductor or vent pipe 38. With this arrangement of air or draft spaces not only will there be no odors or fumes from the receptacle, but bad air, or any air that may be in the room in which the closet is placed, will be drawn down through the seat opening and taken up through the conductor or vent pipe which is connected to the vent opening 12'.

When the lid 16 is closed and the trap plate A thus positioned, the spring 30 is expanded because the closing of the lid 16 draws the trap plate A forward against the tension of said spring 30 by reason of the double armed lever connection 22 between the lid and the trap plate A and the intermediate connections 25 and 27. When the lid 16 is raised or swung on its hinge connection 17 the arm portion $y$ of the double-armed lever 22 is thrown forward in the recess 20 and in the slot 19 of the cleat or the like 18 with the result that the eye bolt 25 which has loose or swinging connection with the arm portion *y* of the double-armed lever 22, swings downward, as shown, as the spring 30 pulls upon the trap plate A causing the latter to assume the dotted line position shown in Fig. 2 in which position there is direct communication from the top of the bowl and through the same to the receptacle 36 and the odors, if any, arising from the receptacle or the bowl being permitted to pass out between the lower portion of the trap plate A and the sides of the bowl, the rear portion of the bowl being of wider dimensions than the front portion.

With the trap plate in its back position as just stated there is still room for odors or fumes to pass from the receptacle to the vent opening but, of course, the larger space in the bowl is in front of the plate instead of at the back as when the trap plate is in its forward position. The seat opening is of course greatly reduced by the body of the person using the device so that even with the larger air space connecting the seat and the receptacle when the plate is in its back position there is small chance for fumes coming out into the room through the seat opening. This backward position of the plate is made necessary in order to have all parts out of the way of the dropping excreta when the closet is being used.

In the ordinary design of dry closet bowls it has heretofore been necessary to make the connecting opening between the seat and receptacle too small for practical and satisfactory use in order to keep this connecting opening the same area as the vent opening so that the natural draft would carry the odors through the vent and not allow their coming back up through the seat opening. It is by virtue of the necessity of heretofore forming this connecting opening so small as to render the device more or less unsatisfactory that I have produced the present invention.

It will be understood that the bowl may be of any convenient shape and size and that it may be secured to a floor or other supporting means in any suitable manner. It will be understood also that the bowl may be manufactured and used separately from the receiving receptacle and that the latter when used may be of any suitable material and size and marketed separately.

In Fig. 4 there is shown a modified form of bowl including the main bowl proper 12ª and an inner bowl 39 providing an air space 40. In this instance the trap plate A' is pivoted at 41 on a bracket 42 which may be secured to the inner bowl 39 in any suitable manner, as for instance, by bolts, rivets or the like 43. A rod 44 is pivotally connected to the rear of the trap plate A' as at 45 and extends up through a slot 46 formed in the seat 14' and which is pivoted at 47 to the lid 16'. The inner bowl 39 may be of any particular formation but at its lower end it is preferably elliptical and when the lid 16' is in closed position the lower end of the bowl 39 is completely closed by the trap plate A' because of the pivotal mounting 41 of the latter and the rod connection 44 between the trap plate and the lid. Thus when the lid is closed the lower end of the inside bowl is also closed and odors may escape through the vent pipe 38' while the inner bowl is effectually sealed against the entrance of odors. When the lid 16' is thrown to open position on its hinge 48 the rod 44 is thrown rearwardly in the slot 46 of the seat 14, and also pulled upwardly with the result that the trap plate A' is swung on its pivot 41 rearwardly away from the lower end of the inner bowl 39, all as shown in dotted lines in Fig. 4, but in which rear position the trap plate A' does not prevent the escape of odors through the vent pipe 38'.

All of the characteristic functions of the first device described are apparent in the second form of invention, the differences residing in the matter of structure of the bowl and the manner of mounting, positioning and operating the trap plate.

What is claimed is:—

1. In a dry closet, a bowl having an opening in its top and an opening in its bottom and also provided with a vent opening adjacent its upper edge, a seat member for the bowl including a seat opening and a slot, a lid hingedly connected to the seat member, a plate swingingly mounted on an axis in the rear portion of the bowl, a lug connected to the underside of the lid and projecting through the slot of the seat member with the portion of the lug which extends into the bowl having an eye, said plate having an apertured lug, a connection between the aperture of the lug of the lid and the apertured lug of the plate whereby, upon closing the lid the plate may be swung forward across the bowl between the top and bottom openings thereof to divide the bowl into upper and lower compartments and from the lower compartment of which odors and fumes may be vented through said vent opening when the lid is closed.

2. In a dry closet, a bowl having an opening in its top and an opening in its bottom and also provided with a vent opening adjacent its upper edge, a seat member for the bowl including a seat opening and a slot, a lid hingedly connected to the seat member, a plate swingingly mounted on an axis in the rear portion of the bowl, a lug connected to the underside of the lid and projecting through the slot of the seat member and having an eye, said plate having an apertured lug, a connection between the aperture of the lug of the lid and the apertured lug of the plate whereby upon closing the lid the plate may be swung forward across the bowl between the top and bottom openings thereof, and means having connection with the plate to swing the latter rearwardly of the bowl when the lid is raised.

3. In a dry closet, a bowl having an opening in its top and an opening in its bottom and also provided with a vent opening adjacent its upper edge, a seat member for the bowl including a seat opening and a slot, a lid hingedly connected to the seat member, a plate swingingly mounted on an axis in the rear portion of the bowl, a lug connected to the underside of the lid and projecting through the slot of the seat member and having an eye, said plate having an apertured lug, a connection between the aperture of the lug of the lid and the apertured lug of the plate, whereby upon closing the lid, the plate may be swung forward across the bowl between the top and bottom openings thereof to divide the bowl into upper and lower compartments, means having connection with the plate to swing the latter rearwardly of the bowl when the lid is raised, and a receptacle having connection with the bowl through the bottom thereof.

In testimony whereof I affix my signature in presence of two witnesses.

EBEN W. PYLE.

Witnesses:
BARD E. MATTHEWS,
J. G. BENNETT.

Copies of this patent may be obtained for five cents each, by addressing the "Commissioner of Patents, Washington, D. C."